(12) United States Patent
Kim et al.

(10) Patent No.: US 9,085,251 B2
(45) Date of Patent: Jul. 21, 2015

(54) STORAGE APPARATUS FOR SEAT OF VEHICLE

(71) Applicants: Hyundai Motor Company, Seoul (KR); DAE WON SAN UP CO., LTD., Ansan-si, Gyeonggi-do (KR)

(72) Inventors: Sang Ho Kim, Hwaseong-si (KR); Soo Hyun Moon, Hwaseong-si (KR); Deok Soo Lim, Hwaseong-si (KR); Jun Yeol Heo, Hwaseong-si (KR); Hyeong Jun Kim, Hwaseong-si (KR); Jae Myung Hur, Seoul (KR); Byeong Hee Jo, Gyeonggi-do (KR); Yong Cheol Jang, Ansan-si (KR)

(73) Assignees: KIA MOTORS CORPORATION, Seoul (KR); DAE WON SAN UP CO., LTD., Ansan-Si, Gyeonggi-Do (KR)

( * ) Notice: Subject to any disclaimer, the term of this patent is extended or adjusted under 35 U.S.C. 154(b) by 0 days.

(21) Appl. No.: 14/079,296

(22) Filed: Nov. 13, 2013

(65) Prior Publication Data

US 2014/0239662 A1 Aug. 28, 2014

(30) Foreign Application Priority Data

Feb. 27, 2013 (KR) ........................ 10-2013-0021589

(51) Int. Cl.
*B60N 2/30* (2006.01)
*B60N 2/44* (2006.01)

(52) U.S. Cl.
CPC ............ *B60N 2/3031* (2013.01); *B60N 2/3065* (2013.01); *B60N 2/3079* (2013.01); *B60N 2002/4455* (2013.01)

(58) Field of Classification Search
CPC ... B60N 2/3065; B60N 2/3011; B60N 2/3077
USPC ................ 297/331, 334, 335, 15; 296/65.05, 296/69.09, 69
See application file for complete search history.

(56) References Cited

U.S. PATENT DOCUMENTS

| | | | |
|---|---|---|---|
| 2,949,331 A * | 8/1960 | Himka ............................ | 296/66 |
| 3,311,405 A * | 3/1967 | Brennan et al. ................. | 296/66 |
| 4,771,507 A * | 9/1988 | Draplin et al. .................. | 16/297 |
| 5,397,167 A * | 3/1995 | Fourrey et al. ........... | 297/354.13 |
| 6,123,380 A * | 9/2000 | Sturt et al. ................. | 296/65.09 |
| 6,601,900 B1 * | 8/2003 | Seibold ....................... | 296/65.09 |
| 7,201,426 B2 * | 4/2007 | Villeminey ................ | 296/65.09 |
| 7,377,582 B2 * | 5/2008 | Fukada et al. ................... | 297/15 |
| 2008/0203772 A1 * | 8/2008 | Holdampf ........................ | 297/15 |
| 2011/0080027 A1 * | 4/2011 | Nakao et al. .................. | 297/311 |
| 2011/0163566 A1 * | 7/2011 | Yamazaki et al. ......... | 296/65.05 |

FOREIGN PATENT DOCUMENTS

| | | |
|---|---|---|
| JP | 2001-001819 A | 1/2001 |
| JP | 2002-316567 A | 10/2002 |

(Continued)

*Primary Examiner* — Pinel Romain
(74) *Attorney, Agent, or Firm* — McDermott Will & Emery LLP

(57) ABSTRACT

A storage apparatus for a seat of a vehicle, in which the seat is stored in a storage space formed therebelow, so that it is possible to secure a wider luggage space as compare with the related art and reduce unit cost without using a separate slide rail. In addition, the storage apparatus variously uses the space of a back seat when shifted between a passenger space (seating mode) and a luggage space (luggage mode) of the multi-functional back seat, which is vertically movable and foldable.

13 Claims, 21 Drawing Sheets

(56) References Cited

FOREIGN PATENT DOCUMENTS

| JP | 2003-025885 A | 1/2003 |
| JP | 2004-359159 A | 12/2004 |
| JP | 2006-123905 A | 5/2006 |
| KR | 2007-0087992 A | 8/2007 |
| KR | 10-2013-0017687 A | 2/2013 |

* cited by examiner

Assembling of seat    Prevention of seat rotation

STORAGE APPARATUS FOR SEAT OF VEHICLE

CROSS-REFERENCE TO RELATED APPLICATION

This application claims under 35 U.S.C. §119(a) the benefit of priority to Korean Patent Application No. 10-2013-0021589 filed Feb. 27, 2013, the entire contents of which are incorporated herein by reference.

TECHNICAL FIELD

The present disclosure relates to a storage apparatus for a seat of a vehicle which secures both a luggage space and a boarding space simultaneously.

BACKGROUND

A demand for more space in a vehicle for passenger seats and lodging has been increasing. For example, increasing leisure activities for people to spend more time driving has increased a demand for more boarding space or for luggage space in a vehicle. Accordingly, there has been an increasing demand for a multi-purpose vehicle (MPV: 6 to 11 passenger vehicle), which can carry more equipment for various kinds of activities.

Particularly, an 11 or more passenger vehicle having an arrangement of four-row seats or more has several seat functions in order to obtain more luggage space.

In order to obtain as much as possible of luggage space in the vehicle, there have been proposed several types of accommodation portions on a floor, thereby accommodating a seat in the accommodation portion.

U.S. Pat. No. 6,997,498 discloses a seat apparatus for a vehicle, which inserts a seat into a concavely formed accommodation portion, using an X-type link or damper.

U.S. Pat. No. 7,328,930 discloses a seat for a vehicle, which is mounted to be foldable on a floor by two links.

As a representative type of MPVs, a seat structure has been disclosed in which an accommodation portion 1 can be separated from the seating position 3 of a seat 2 as shown in FIG. 1.

There has also been disclosed a seat structure in which, as shown in FIG. 2, a fourth row seat 6 can be moved to a third row seat as close as possible, using a slide rail mounted on a floor, by rotating and tipping up a front end portion of a seat cushion 5 in the direction of the seat back 6.

As described above, a vehicle having an arrangement of three or four-row seats implements various seat functions in order to achieve more space. However, a vehicle having an arrangement of four-row seats further has one more row of seats than that of three-row seats. Therefore, there are some difficulties in achieving sufficient space.

SUMMARY

The present disclosure provides a storage apparatus for a seat of a vehicle, in which the seat is stored in a storage space defined therebelow. Therefore, it is possible to achieve more space as compared to the related art, reduce unit cost by eliminating a separate slide rail, and use the back seat space by shifting between a passenger space (seating mode) and a luggage space (luggage mode) of the multi-functional back seat which is vertically movable and foldable.

In an aspect of the present disclosure, a storage apparatus for a seat of a vehicle includes a plurality of links supporting the seat including a seat back and a seat cushion, and mounted on the floor in a hinge structure so as to be foldable and adjustable. An elastic member returns the seat to an original position thereof by adjusting the storage state of the seat, wherein the seat is stored inside a storage space recessed into the floor in a luggage mode or returned to the original position in a seating mode.

In an exemplary embodiment, the links may include a front upper link and a front lower link, mounted to a front of the seat cushion in the hinge structure so as to be foldable and adjustable. A rear link is rotatably mounted to a rear of the seat cushion, and a main link is rotatably mounted between the front upper link and the seat back in the hinge structure. A guide link is connected between the main link and the rear link in the hinge structure.

In another exemplary embodiment, the main link may guide the front upper and front lower links to be folded inside the storage space when the seat back is folded and the seat cushion is lowered.

In still another exemplary embodiment, the guide link may maintain the interval between the main link and the rear link by simultaneously rotating together with the main link and the rear link when the seat back is folded and the seat cushion is lowered. Further, the guide link may evenly transfer the weight of the seat to the main link and rear link.

In yet another exemplary embodiment, the front upper link, the front lower link, the main link, the rear link and the guide link may move together, and each link may constantly move in one direction.

In still yet another exemplary embodiment, the storage apparatus may include a recliner mounted to the seat back and maintain an adjusted or folded state of the seat back by locking the seat back. A striker is fixed to a bottom of the storage space. A cushion locking latch is mounted to a seat cushion frame in the hinge structure and maintains the storage state of the seat in such a manner that the cushion locking latch is latched to the striker.

In a further exemplary embodiment, the storage apparatus may include an operation strap manually releasing a locking state of the seat back, and a recliner releasing lever to release the locking of the recliner. A back recliner release lever assembly is mounted to the seat back and is connected to the recliner release lever through a back recliner release cable, so as to release the locking of the recliner. A cushion locking release lever assembly is mounted to the seat cushion and is connected to the cushion locking latch through a cushion locking release cable, so as to release the locking of the cushion locking latch. A connection cable connects the back recliner release lever assembly, and the cushion locking release lever assembly, thereby simultaneously releasing the locking of the recliner and the locking of the cushion locking latch when the operation strap is operated.

The back recliner release lever assembly may include a seat back rotation lever having one end portion mounted to the seat back and the other end portion rotated by being linked with the operation strap. A fixing projection disposed around one end portion of the seat back rotation lever is connected to the back recliner release cable and the connection cable, so as to simultaneously operate the back recliner release cable and the connection cable when rotating in one direction.

The cushion locking release assembly may include a seat cushion rotation lever rotatably mounted to the seat cushion in the hinge structure. A fixing projection disposed at an edge of the seat cushion rotation lever is connected to the cushion locking release cable and the connection cable, so as to simultaneously operate the cushion locking release cable and the connection cable when rotating in one direction. The seat back rotation lever and the seat cushion rotation lever are linked with each other through the connection cable.

The elastic means may include a torsion spring mounted between the links, so as to return the seat to the original state by adjusting the links in the folding state by means of an elastic recovery force thereof. A spiral spring is mounted at a lower end of the seat back, so as to return the seat to the original state by adjusting the seat back in the folding state by means of an elastic recovery force thereof.

The storage apparatus may include a rear mounting bracket mounted to the rear link in the hinge structure, having guide pins respectively deposed at both side lower ends thereof. Seat attaches are mounted at the rear of the storage space while being spaced apart in the width direction of the vehicle, and guide groove portions are respectively disposed at both side lower ends thereof. The rear mounting bracket is first assembled to the seat attaches by latching the guide pins to guide groove portions when the seat is assembled, thereby facilitating the assembling of the seat.

The seat may include a mounting bracket fixing frame fixed and attached to an upper-end portion of the rear mounting bracket using an irregularity structure. The mounting bracket fixing frame may prevent the rear mounting bracket from rotating about the rear link, thereby preventing the degradation of workability caused by vehicle body interference when assembling the seat.

The upper-end portion of the rear mounting bracket and an irregularity portion of the mounting bracket fixing frame may be vertically bolted to each other, so that a mounting aperture is easily recognized.

Advantages of the storage apparatus for the seat of the vehicle are described as follows.

1. Modification of link structure

1) The guide link connects the main link and the rear link to prevent stress concentration caused by coupling between the existing guide link and the back side bracket, thereby improving the hardness of the back side bracket.

2) One of the existing two side covers is removed by modifying the link structure, thereby preventing the external appearance of the link from being exposed with one side cover and obtaining an aesthetic appearance benefit of the link.

2. Improvement of assembling method of rear mounting

1) The seat attaches are manufactured separately from the seat and fixed at three places of the rear of the storage space. The seat attaches are spaced apart from one another in a width direction of the vehicle before the rear link of the seat is assembled to the storage space, thereby improving assembling performance and workability.

Further, upper and lower sides of an attach main body are bolted together based on the ninth hinge of the rear link. Therefore, it is possible to prevent stress concentration caused by a vertical rotation moment when the rear link rotates in the vertical direction, thereby enhancing the hardness of the seat attach.

2) The mounting bracket fixing frame prevents the rear mounting bracket from rotating in the front-back direction about the ninth hinge of the rear link, thereby improving the assembling performance of the seat.

3) The guide pin of the rear mounting bracket is assembled to the U-shaped guide groove portion disposed at both sides of the seat attach. The rear mounting bracket is fastened to the seat attach, thereby facilitating the assembling between the rear mounting bracket and the seat attach.

4) The protruding plate used in the seat attach prevents the seat from drooping downward when the seat is assembled and prevents the seat from rotating backward, thereby improving assembling performance.

5) The rear mounting bracket is fastened with a vertical bolt to easily recognize a mounting aperture.

3. The cushion locking latches are respectively used on both sides of the seat cushion frame to prevent the locking of the seat from being released from the floor, which may be caused by irregular driving, vehicle collision, etc., thereby preventing an accident.

4. The locking between the back recliner and the cushion locking latch are simultaneously released using the operation straps and connection cables, thereby decreasing the number of various cables and components.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure.

Figure 1:
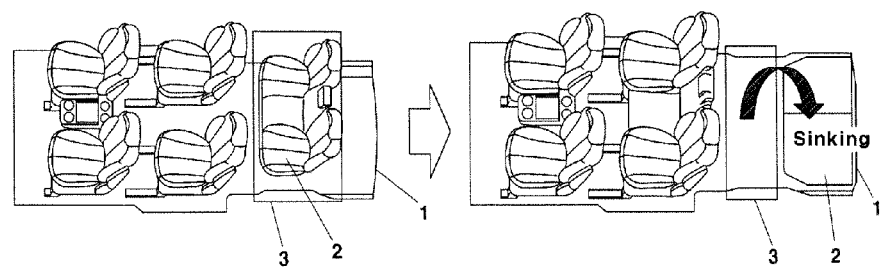
FIG. 1 is a view showing an example of a seat storage apparatus according to a related art.
Figure 2:
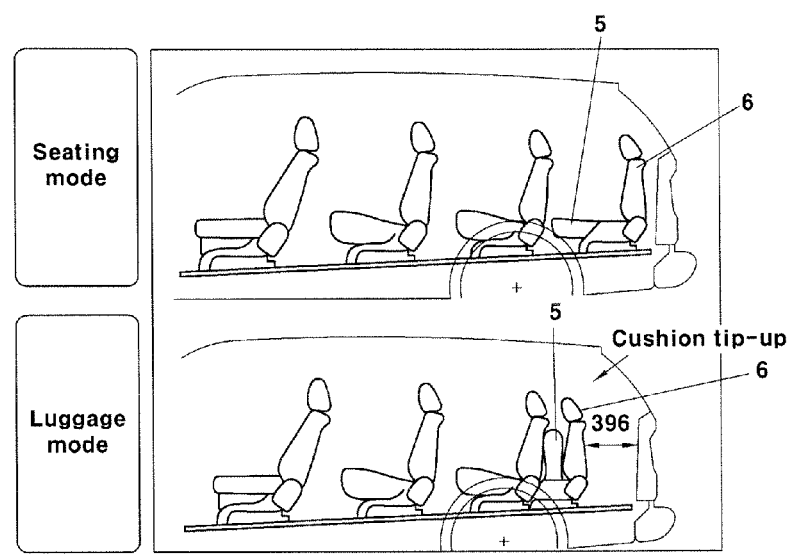
FIG. 2 is a side view showing a structure in which seats are closely adhered using a slide rail according to a related art.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the disclosure will be described in conjunction with exemplary embodiments, it will be understood that present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

Figure 3:
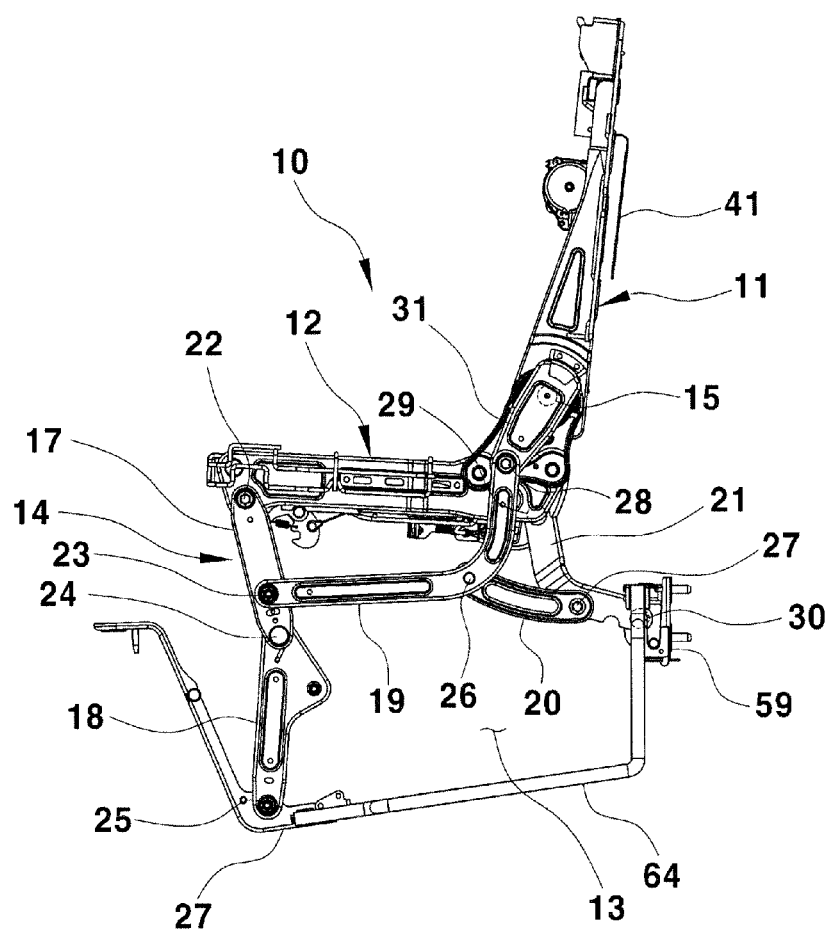
FIG. 3 is a side view of a storage apparatus for a seat in a seating mode according to an embodiment of the present disclosure.
Figure 4:
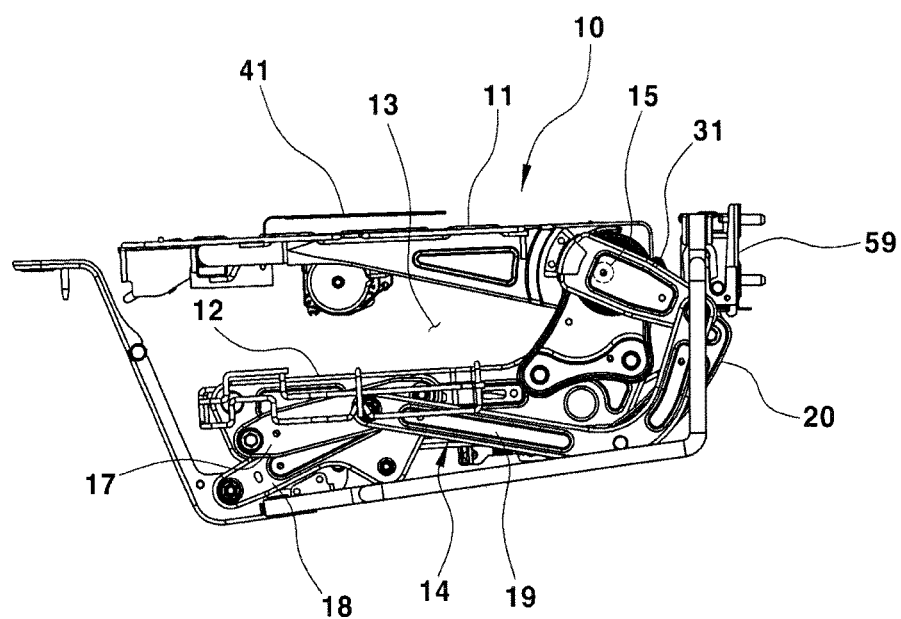
FIG. 4 is a side view of the storage apparatus for the seat in a luggage mode according to the embodiment of the present disclosure.

FIG. 3 is a side view of a storage apparatus for a seat 10 in a seating mode according to an embodiment of the present disclosure. FIG. 4 is a side view of the storage apparatus for the seat 10 in a luggage mode according to the embodiment of the present disclosure.

According to the present disclosure, a storage apparatus for a seat of a vehicle enables the space of a back seat 10 in a multi-purpose vehicle (MPV) to be widely used as a luggage storage space by freely shifting the seat 10 to be in a seating mode or luggage mode as a passenger desires.

In the storage apparatus according to the present disclosure, the space of the back seat 10 in the MPV is used as a luggage storage space. Particularly, the storage apparatus can be applied to a four-row seat in an 11 passenger vehicle, and the like.

The seating mode refers to a mode in which a seat back 11 and a seat cushion 12 are adjusted so that passengers can sit on the back seat 10. The luggage mode refers to a mode in which the seat back 11 and the seat cushion 12 are folded and stored in a storage space 13 provided in the floor.

The storage apparatus according to the present disclosure freely shifts the seat 10 between the seating mode and the luggage mode with a plurality of links 14 on the bottom surface of the seat 10.

The seat 10 includes the seat cushion 12 and the seat back 11. The seat back 11 is foldable or adjustable by rotating in the front-back direction from the seat cushion 12 by a back hinge 15.

The back hinge 15 is disposed at a portion where the lower-end portion of the seat back 11 is connected to the rear-end portion of the seat cushion 12. A recliner 16 as a locking means is mounted inside the back hinge 15 to maintain the seat back 11 in a folded state or adjusted state.

The link 14 is connected in a hinge structure between the seat 10 and the bottom surface (or rear surface) of the storage space 13, so as to freely shift the seat 10 between the luggage mode and the seating mode and to support the seat 10.

The links 14 include front upper link 17 and front lower link 18 supporting the front of the seat cushion 12. A rear link 21 supports the rear of the seat cushion 12. A main link 19 is connected between the front upper link 17 and the seat back 11, and a guide link 20 is connected between the main link 19 and the rear link 21.

Connection portions between the links 14 are connected by hinges. A first hinge 22 is disposed at a portion where the upper-end portion of the front upper link 17 is connected to the front-end portion of the seat cushion 12. A second hinge 23 is disposed at a portion where a lower portion of the front upper link 17 is connected to the front end portion of the main link 19. A third hinge 24 is disposed at a portion where the lower-end portion of the front upper link 17 is connected to the upper-end portion of the front lower link 18, and a fourth hinge 25 is disposed at a connection portion between the lower-end portion of the front lower link 18 and a bottom front of the storage space 13. A fifth hinge 26 is disposed at a portion where a middle portion of the main link 19 is connected to the front-end portion of the guide link 20. A sixth hinge 27 is disposed at a portion where the rear-end portion of the guide link 20 is connected to the rear-end portion of the rear link 21, and a seventh hinge 28 is disposed at a portion where the rear-end portion of the main link 19 is connected to a lower-end side bracket of the seat back 11. An eighth hinge 29 is positioned at a portion where the rear-end portion of the seat cushion 12 is connected to the upper-end portion of the rear link 21 (in the seating mode), and a ninth hinge 30 is disposed at a connection portion between the lower-end portion of the rear link 21 and a rear upper-end portion of the storage space 13.

The links 14 operated systematically at the same time when shifting between the seating mode and luggage mode of the seat 10.

Referring to FIG. 4, when the seat back 11 is folded forward in the luggage mode, the main link 19 connected to a lower end (a back side lower bracket 31) of the seat back 11 is pulled backward and downward. The front upper link 17 and the guide link 20, respectively connected to the front and rear sides of the main link 19 rotate downward in the storage space 13. Simultaneously, the front lower link 18 connected to the lower end of the front upper link 17 rotates downward in the storage space 13. The lower-end portion of the seat cushion 12 and the rear link 21 connected to the rear end of the guide link 20 rotate downward inside of the storage space 13, so that the seat back 11 and the seat cushion 12 are folded and inserted inside of the storage space 13.

The links 14 are operate in the reverse in the seating mode, so that the seat back 11 is adjusted while the seat back 11 and the seat cushion 12 are ascending.

Figure 5:
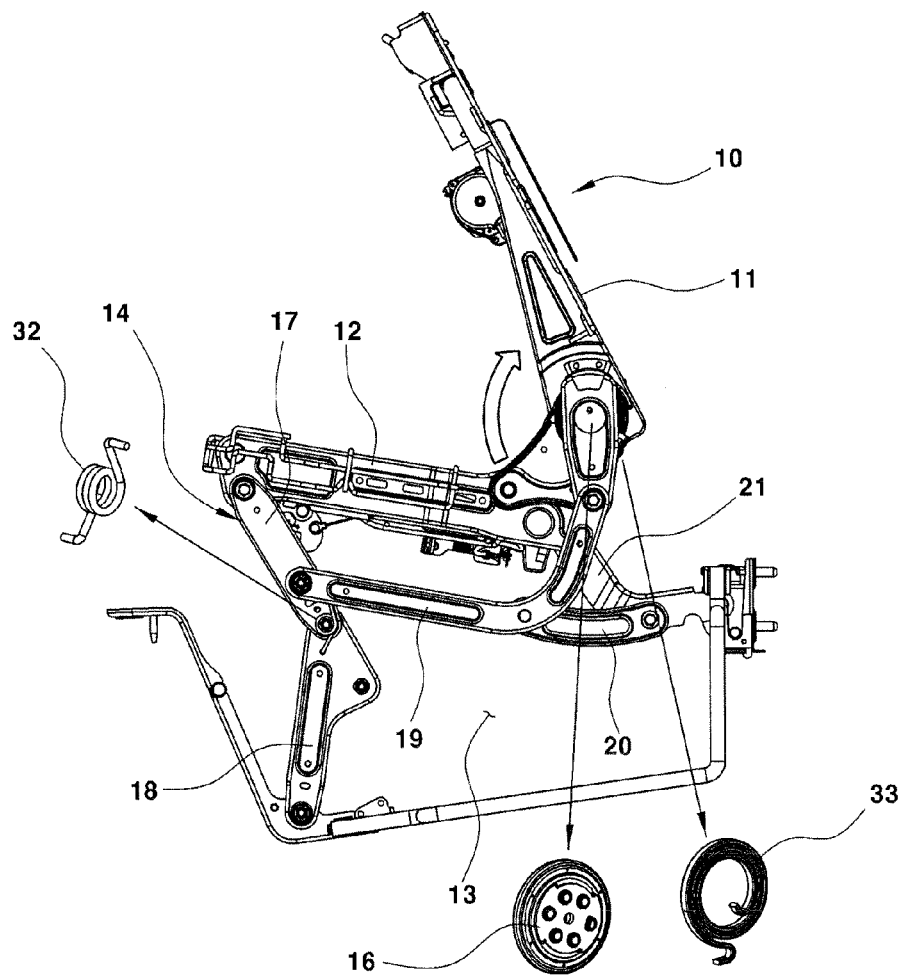
FIG. 5 is a side view showing a shifting state from the luggage mode to the seating mode according to the present disclosure.

FIG. 5 is a side view showing a shifting state from the luggage mode to the seating mode according to the present disclosure. The present disclosure provides an elastic means such as a spring, which is a power source for shifting from luggage mode to seating mode.

A torsion spring 32 is mounted to the third hinge 24 through which the front upper and lower links 17 and 18 are connected to each other, and a spiral spring 33 is mounted to the back hinge 15 of the seat back 11.

The torsion spring 32 is coil wound in a spiral direction while maintaining the same diameter in the axis direction thereof. Both end portions of the coil are respectively fixed to the front upper and lower links 17 and 18 to adjust the front upper and lower links 17 and 18 that are folded by the elastic recovery force of the torsion spring 32 when shifting from the luggage mode to the seating mode.

The spiral spring 33 is coil wound in a spiral direction while the diameter is gradually increased in the same plane. Both end portions of the coil are respectively fixed to the back hinge 15 and a seat cushion frame 35 to adjust the folded seat back 11 by the elastic recovery force of the spiral spring 33 when shifting from the luggage mode to the seating mode.

Figure 6:
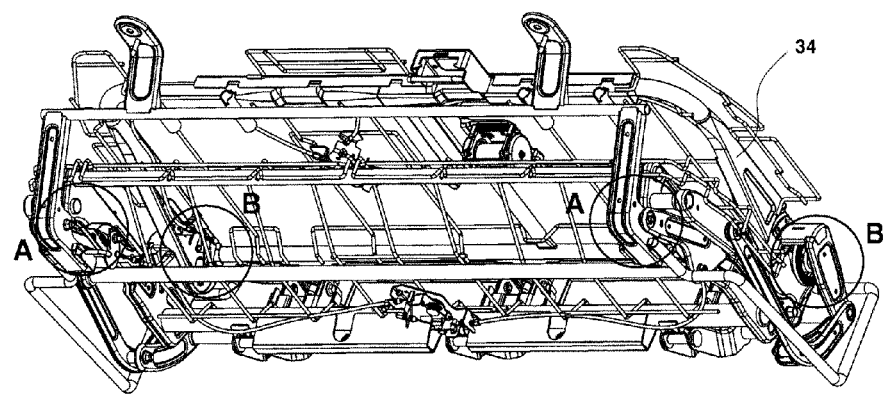
FIG. 6 is a bottom perspective view of the seat in the luggage mode according to the present disclosure.
Figure 7A:
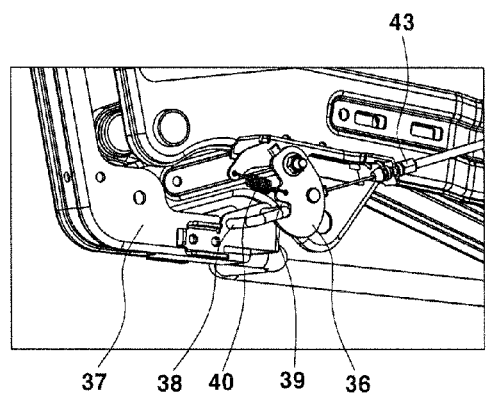
FIGS. 7A and 7B are enlarged views of portion A of FIG. 6, which are perspective views showing a configuration and operating state of a cushion locking latch.
Figure 7B:
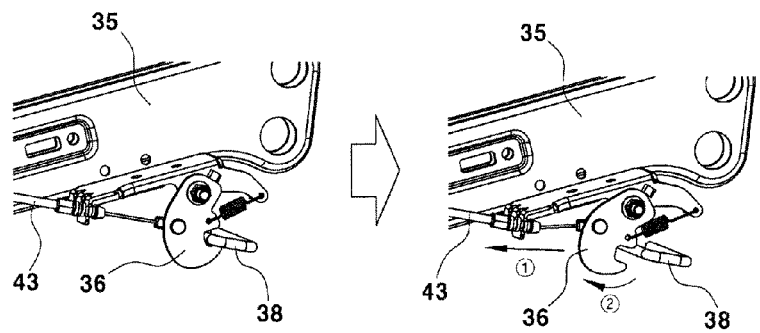
Figure 8:
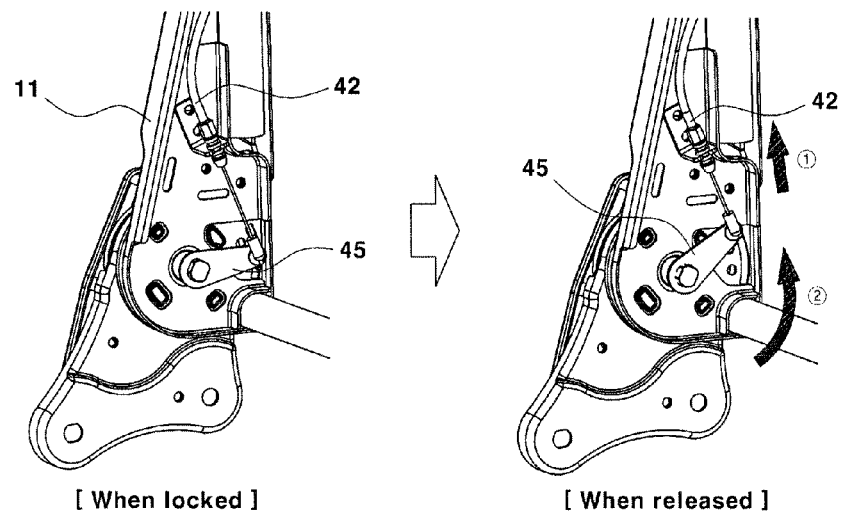
FIG. 8 is an enlarged view of portion B of FIG. 6, which is a perspective view showing an operating state of a recliner release lever.

FIG. 6 is a bottom perspective view of the seat 10 in the luggage mode according to the present disclosure. FIGS. 7A and 7B are enlarged views of portion A of FIG. 6, which are perspective views showing a configuration and operating state of a cushion locking latch 36. FIG. 8 is an enlarged view of portion B of FIG. 6, which is a perspective view showing an operating state of a recliner release lever 45.

In the present disclosure, a locking means maintains the seat 10 in the luggage mode to prevent the locking of the seat 10 from being released from the floor due to irregular driving, vehicle collision, etc. The locking means may comprise a cushion locking means for locking the seat cushion 12 and a back locking means for locking the seat back 11.

The cushion locking means includes a cushion locking latch 36 mounted to the seat cushion frame 35 and a striker 38 fixed to a front mounting frame 37. The front mounting frame 37 is fixed to the bottom surface of the storage space 13, and the striker 38 is formed in a 'U' shape. The striker 38 protrudes inner side direction of the storage space 13 from a side surface of the front mounting frame 37.

The cushion locking latch 36 has a planar structure, and the upper-end portion of the latch 36 is coupled to the seat cushion frame 35 in the hinge structure. Thus, the cushion locking latch 36 can rotate in the front-back direction from the seat cushion frame 35 while lowering downward together with the seat cushion frame 35.

The latch 36 has a latching groove 39 on the front side of the flate plate latch 36. Thus, the latch 36 can be latched to the striker 38 through the latching groove 39.

The front portion of the latch 36 is elastically supported by a return spring 40 fixed to the seat cushion frame 35. The return spring 40 returns the latch 36 to the original position of the latch 36 when the interference between the latch 36 and the striker 38 is released after the lower-end portion of the latch 36 is rotated.

The lower-end portion of the latch 36 has a circular shape. Thus, when the seat cushion frame 35 is lowered in the luggage mode, the latch 36 is interfered with the rear-end portion of the striker 38 while moving downward so that the lower-end portion of the latch 36 is rotated backward.

The operating state of the latch 36 will be described. When the seat cushion frame 35 is lowered and stored inside the storage space 13 in the case of shifting from the seating mode to the luggage mode, the lower-end portion of the latch 36 rotates backward due to the interference between the lower-end portion of the latch 36 and the rear-end portion of the striker 38.

If the interference between the striker 38 and the latch 36 is released by the rotation of the latch 36, the latch 36 further lowered and simultaneously returns to the original position by the elastic recovery force of the return spring 40. The rear-end portion of the striker 38 is latched to the latching groove 39 of the latch 36, so that the latch 36 and the striker 38 are locked, thereby maintaining the folding state of the front lower link 18 and the storage state of the seat cushion 12.

The cushion locking means is applied to both sides of the seat cushion 12, so that it is possible to prevent the locking of the seat cushion 12 from being released at one side when the cushion locking means is applied to only one side of the seat cushion 12.

The back locking means locks the recliner 16 mounted to the back hinge 15, and thus, the folding state of the seat back 11 can be locked by the recliner 16.

Figure 9:
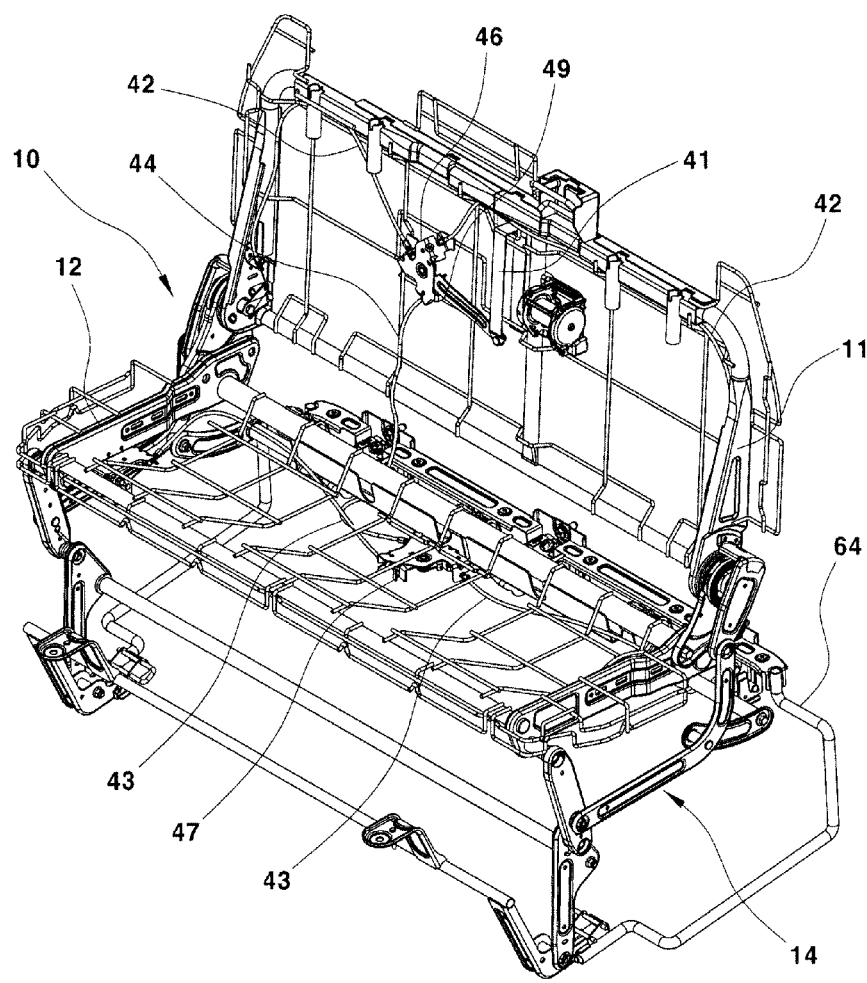
FIG. 9 is a perspective view of the seat in the seating mode according to the present disclosure.
Figure 10:
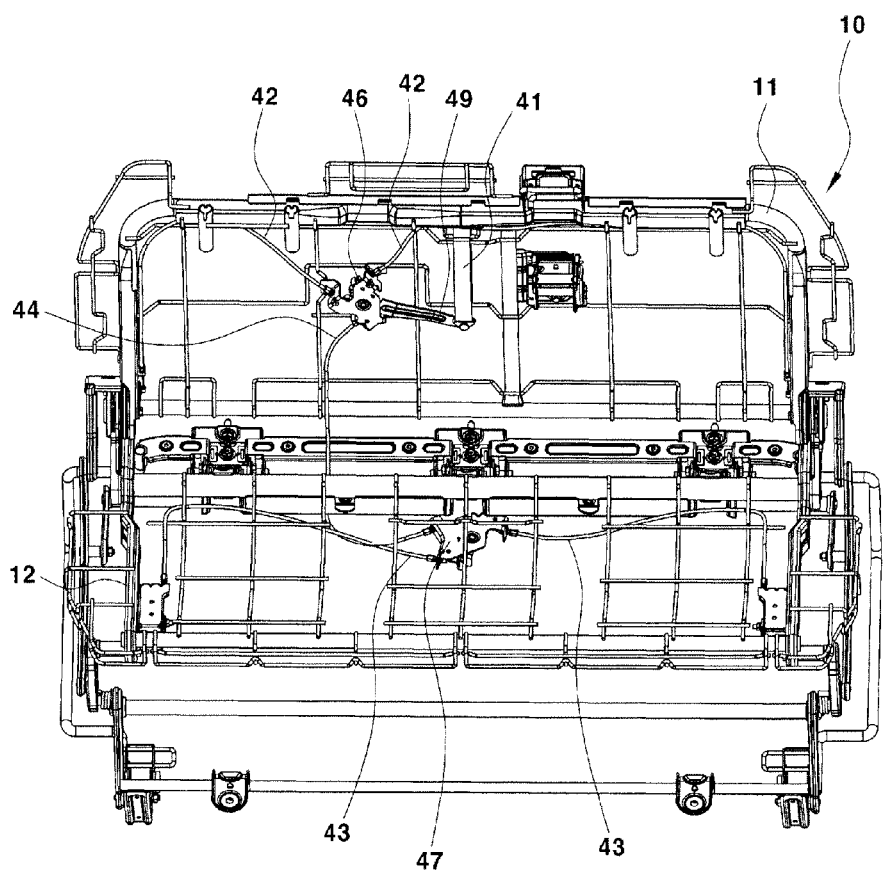
FIG. 10 is a front view of FIG. 9.
Figure 11:
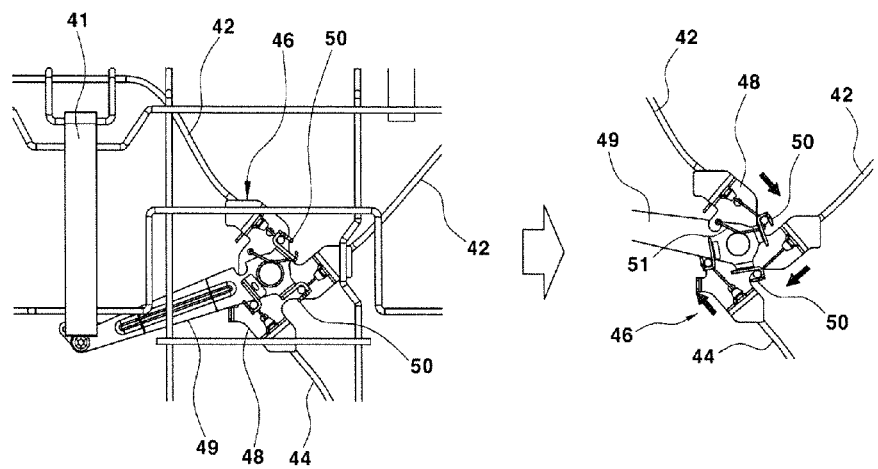
FIG. 11 is a view showing an operating state of a back recliner release lever assembly according to the present disclosure.
Figure 12:
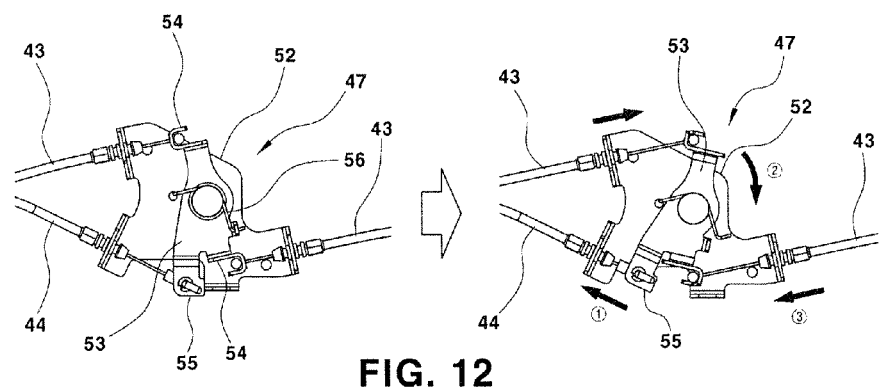
FIG. 12 is a view showing an operating state of a cushion locking release lever assembly according to the present disclosure.

FIG. 9 is a perspective view of the seat 10 in the seating mode according to the present disclosure. FIG. 10 is a front view of FIG. 9. FIG. 11 is a view showing an operating state of a back recliner release lever assembly 46 according to the present disclosure. FIG. 12 is a view showing an operating state of a cushion locking release lever assembly 47 according to the present disclosure.

The present disclosure provides a locking release means for releasing the cushion locking means and the back locking means.

The locking release means includes an operation strap 41 mounted to the seat back 11 so as to be vertically movable, various kinds of cables for releasing the back locking means and the cushion locking means, and a release lever assembly for simultaneously operating the various kinds of cables.

The operation strap 41 has a shape obtained by turning over a 'U' formed vertically long. The operation strap 41 is disposed outside of the seat back 11 so as to be vertically movable. Thus, a passenger can manually manipulate the operation strap 41.

The various kinds of cables include: back recliner release right and left cables 42 for releasing the back locking means, cushion locking release right and left cables 43 for releasing the cushion locking means, and connection cables 44 for simultaneously operating the back locking means and the cushion locking means by connecting the back locking means and the cushion locking means to each other.

The back recliner release right and left cables 42 are respectively connected to recliner release levers 45 mounted to the left and right sides of the seat back 11 so that the recliner 16 is released.

That is, one end portion of the recliner release lever 45 is hinge-coupled to the back hinge 15, and the other end portion of the recliner release lever 45 is connected to the back recliner release cable 42. Thus, if the recliner release lever 45 is rotated upward by the back recliner release cable 42, the recliner 16 can be released.

The cushion locking release right and left cable 43 are connected to rear portions of the cushion locking latch 36 that is mounted at the left and right sides of the seat cushion frame 35. Therefore, locking between the striker 38 and the latch 36 can be released as the latch 36 is pulled backward.

The release lever assembly includes a back recliner release lever assembly 46 connected to the back recliner release cable 42, and a cushion locking release lever assembly 47 connected to the cushion locking release cable 43.

The back recliner release lever assembly 46 includes a seat back bracket 48 mounted to the seat back frame 34 and a seat back rotation lever 49 rotatably mounted to the seat back bracket 48 in the hinge structure.

The seat back bracket 48 has projections protruding in three directions while being spaced apart from one another in the circumferential direction, and the end portion of a protection cover of the back recliner release cable 42 is fixed by the projection. Thus, the seat back bracket 48 extracts and inserts the end portion of the back recliner release cable 42 in the straight line direction from each projection.

One end portion of the seat back rotation lever 49 is rotatably coupled to the central portion of the seat back bracket 48 in the hinge structure. The other end portion of the seat back rotation lever 49 is connected to the lower-end portion of the operation strap 41 to rotate the seat back rotation lever 49 in the vertical direction.

Three J-shaped fixing projections 50 protrude around the one end portion of the seat back rotation lever 49 while being spaced apart from one another. The end portions of the back recliner release right and left cables 42 and the end portions of the connection cables 44 are fixed one to one. Each cable is rotated and extracted in the same direction to release locking of the back recliner.

The return spring 40 such as the torsion spring 32 is mounted to a rotation hinge mounted at the central portion of the seat back bracket 48. Both end portions of the torsion spring 32 are respectively fixed to the seat back bracket 48 and the seat back rotation lever 49. Thus, when the rotational force of the seat back rotation lever 49 is released, the seat back rotation lever 49 returns to the original position by the elastic recovery force of the return spring 40.

The cushion locking release lever assembly 47 includes a seat cushion bracket 52 mounted to the seat cushion frame 35 and a seat cushion rotation lever 53 rotatably mounted to the seat cushion bracket 52 in the hinge structure.

The seat cushion bracket 52 has projections protruding in three directions while being spaced apart from one another in the circumferential direction, and the end portion of a protection cover of the cushion locking release cable 43 is fixed by the projection. Thus, the seat cushion bracket 48 can extract and insert the end portion of the back recliner release cable 42 in the straight line direction from each projection.

The central portion of the seat cushion rotation lever 53 is rotatably coupled to the central portion of the seat cushion bracket 52 in the hinge structure. J-shaped fixing projections 50 are disposed at upper and lower edge portions of the seat cushion rotation lever 53.

The cushion locking release right and left cables 43 are respectively connected to the fixing projections disposed at the upper and lower edge portions of the seat cushion rotation lever 53, and the connection cable 44 is coupled to the cable fixing projection 55 disposed at the lower edge portion of the seat cushion rotation lever 53. Thus, when the seat cushion rotation lever 53 rotates in one direction by the connection cable 44, the cushion locking release right and left cables 43 and the connection cable 44 can be rotated and extracted in the same direction, thereby releasing the cushion locking means.

The return spring 40 such as the torsion spring 32 is mounted to a rotation hinge mounted at the central portion of the seat cushion bracket 52, and both end portions of the torsion spring 32 are respectively fixed to the seat cushion bracket 52 and the seat cushion rotation lever 53. Thus, if the rotary force of the seat cushion rotation lever 53 is released, the seat cushion rotation lever 53 can return to the original position by the elastic recovery force of the return spring 40.

The connection cable 44 simultaneously operates the seat back rotation lever 49 and the seat cushion rotation lever 53 by connecting the seat back rotation lever 49 and the seat cushion rotation lever 53.

Hereinafter, an operating state of the storage apparatus for each mode according to the present disclosure will be described in detail.

Figure 13:
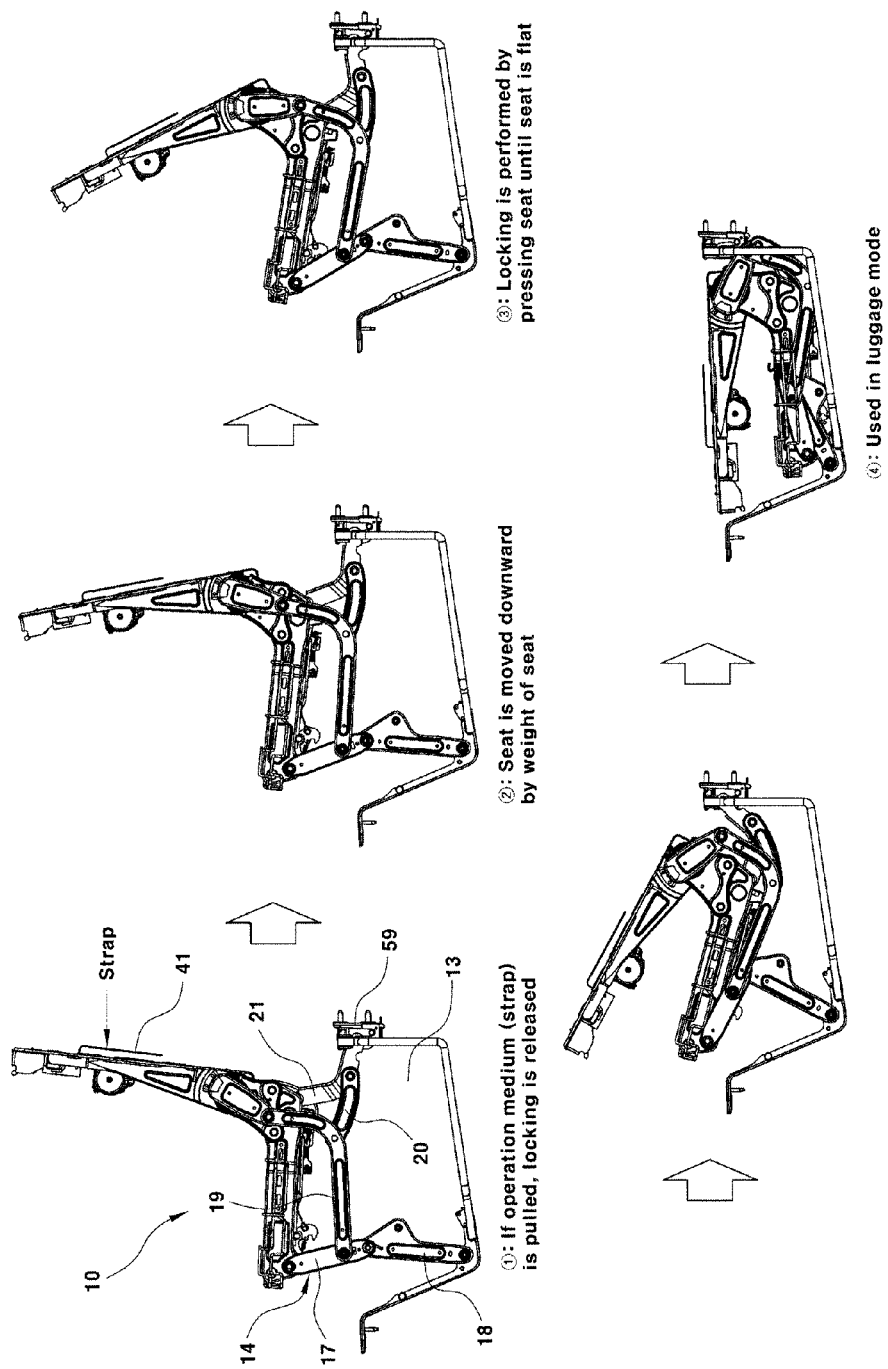
FIG. 13 is a view showing a shifting state from the seating mode to the luggage mode according to the present disclosure.

FIG. 13 is a view showing a shifting state from the seating mode to the luggage mode according to the present disclosure.

1. Luggage Mode

The locking state of the recliner 16 is released by upwardly moving the operation strap 41 mounted to the seat back 11.

When the operation strap 41 moves upward, the fixing projection 50 disposed at the right end portion of the seat back rotation lever 49 rotates as the seat back rotation lever 49 connected to the lower-end portion of the operation strap 41 rotates.

The one end portions of the back recliner release right and left cables 42 respectively connected to the rotated fixing projections 50 are extracted, and the other end portions of the extracted back recliner release right and left cables 42 are pulled. Thus, the locking state of the recliner 16 is released by rotating the recliner release lever 45.

Subsequently, as the locking state of the recliner 16 is released, the seat 10 can be stored in the storage space 13 by folding the seat back 11 forward until the seat back 11 becomes horizontally leveled to the seat cushion 12.

The operating state of the links 14 where the seat back 11 and the seat cushion 12 are completely inserted into the storage space 13 will be described in detail hereinbelow.

FIGS. 14 and 14a to 14e are views showing a shifting state of the links 14 from the seating mode to the luggage mode according to present disclosure.

The front upper link 17, the front lower link 18, the main link 19, the guide link 20, and the rear link 21 move in one direction together to improve the ability of the seat 10 to simultaneously secure wide luggage and seat spaces.

For example, the front upper and front lower links 17 and 18 support the front-end portion of the seat cushion frame 35, which are adjustably and foldably connected, so that it is possible to shift between the seating mode and the luggage mode.

Figure 14:
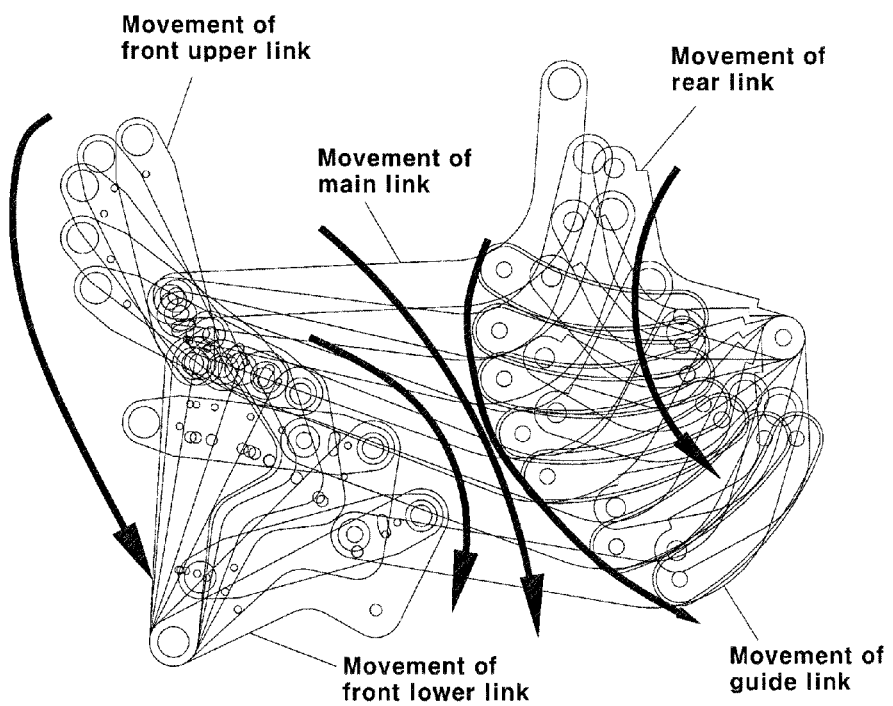
FIGS. 14 and 14A to 14E are views showing an operating state of links in the shift from the seating mode to the luggage mode according to the present disclosure.
Figure 14A:
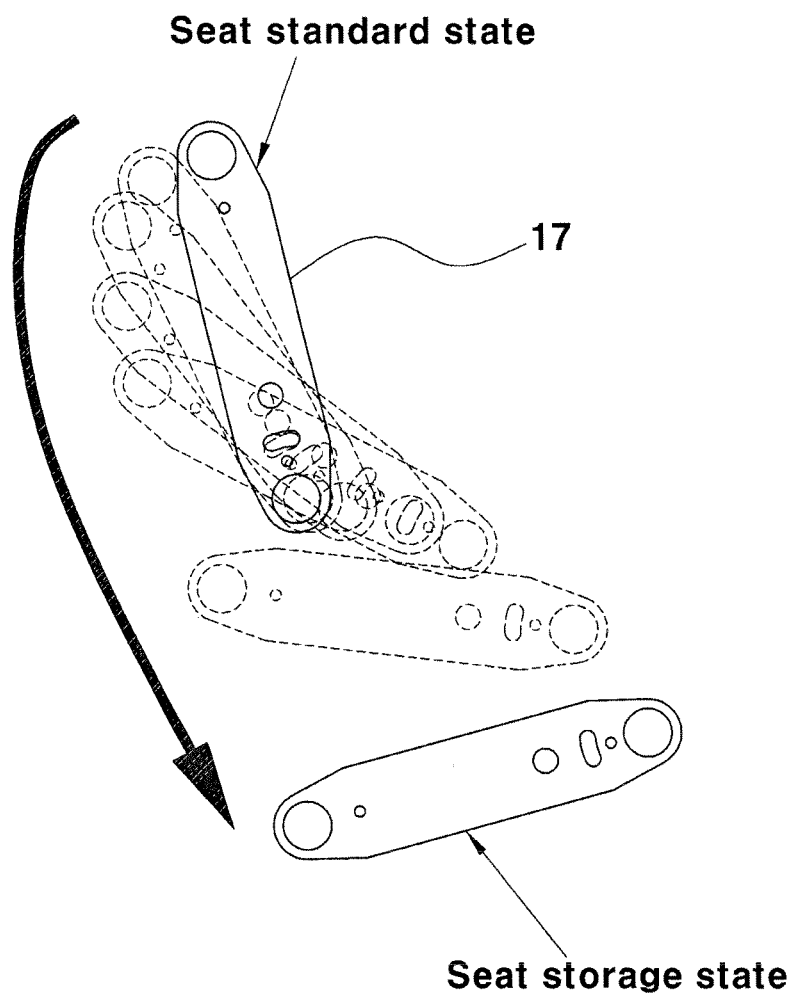

Referring to FIG. 14a, when shifting from the seating mode to the luggage mode, the upper-end portion of the seat cushion 12 diagonally rotates as the front upper link 17 is completely adjusted (seat standard state). The slope of the front upper link 17 is then reversed after the horizontal state of the front upper link 17 is adjusted. The upper-end portion of the seat cushion 12 is slightly, diagonally disposed in the opposite direction in the storage state of the seat 10. In this case, the front upper link 17 is entirely moved downward.

Figure 14B:
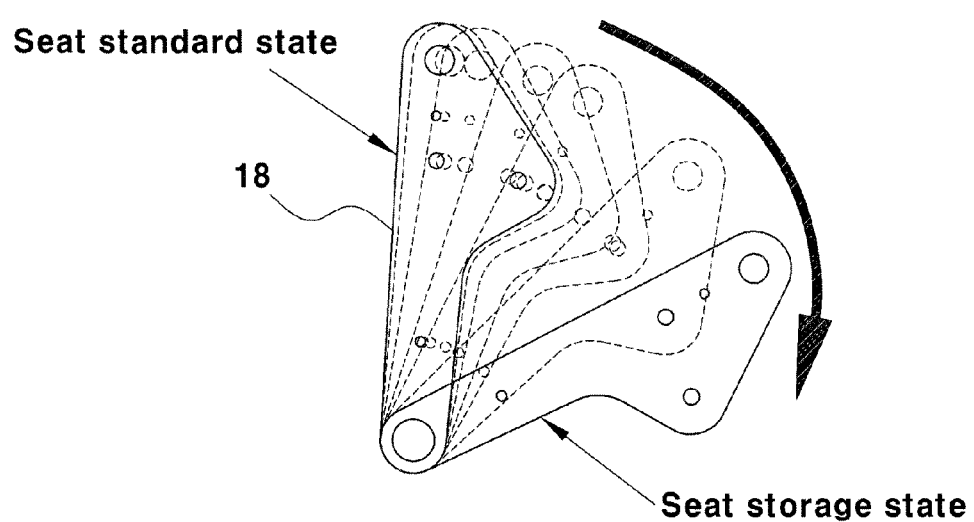

Referring to FIG. 14b, when shifting from the seating mode to the luggage mode, the upper-end portion of the seat cushion 12 downwardly rotates about the fourth hinge 25 as the front lower link 18 is completely adjusted (seat standard state). The upper-end portion of the seat cushion 12 is diagonally disposed toward the horizontal state in the storage state of the seat 10. In this case, the front lower link 18 is moved downward.

The main link 19 connects the front upper link 17 and the seat back frame 35. When shifting from the seating mode to the luggage mode, the seat back 11 can be folded by backwardly pulling the front upper link 17, and simultaneously folding the front upper and front lower links 17 and 18.

Figure 14C:
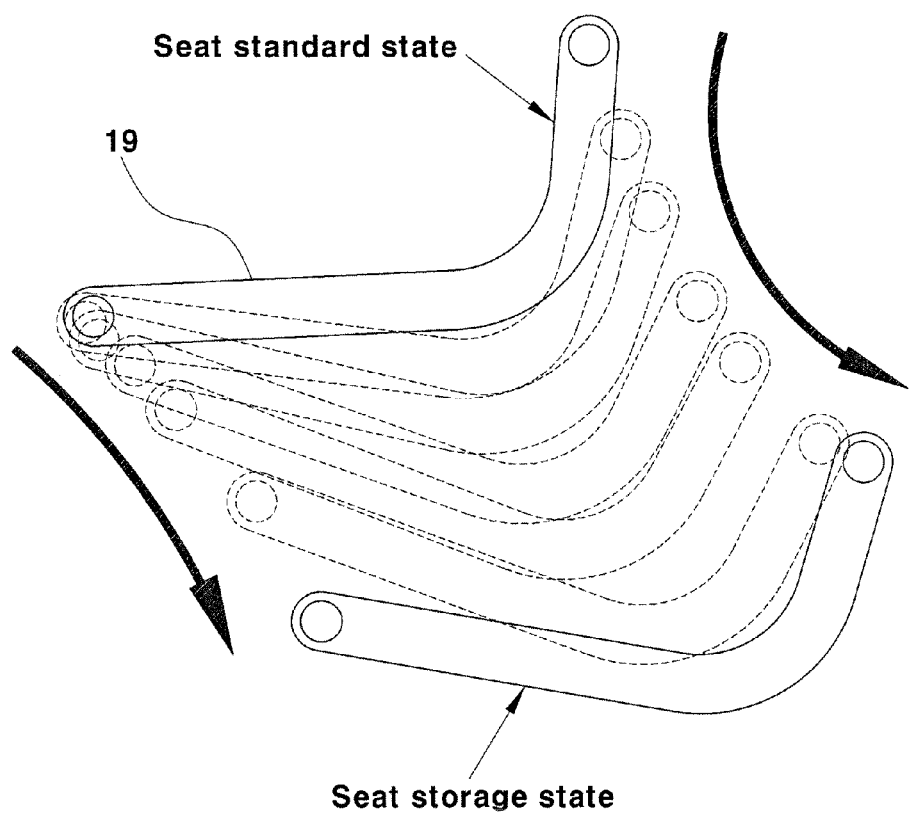

Referring to FIG. 14c, when shifting from the seating mode to the luggage mode, the front-end and rear-end portions of the main link 19 harmoniously move from the 4 to 5 o'clock direction.

The guide link 20 connects the main and rear links 19 and 21, constantly maintains the interval between the main and rear links 19 and 21 when shifting from the seating mode to the luggage mode, and uniformly transfers the weight of the seat 10 to the main and rear links 19 and 21, thereby improving the durability of the links 14.

Figure 14D:
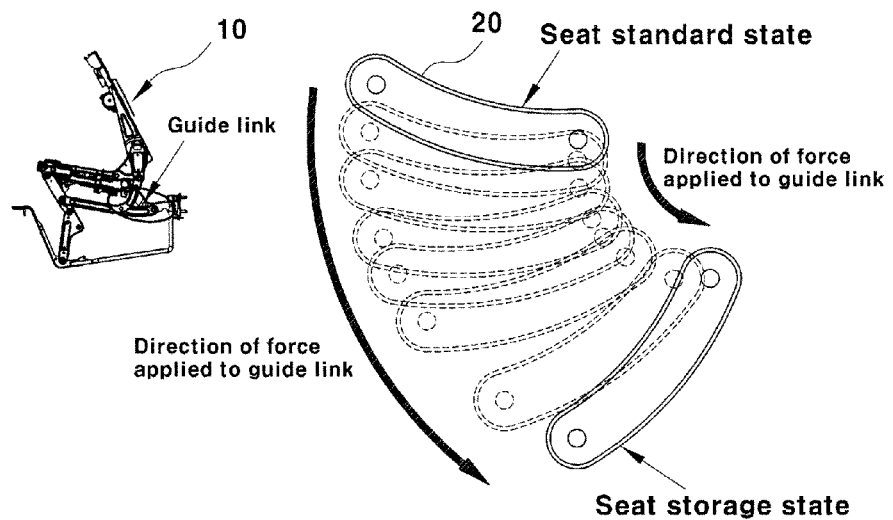

Referring to FIG. 14d, when shifting from the seating mode to the luggage mode, the guide link 20 is in an almost horizontal state at the standard position of the seat 10. The front-end portion of the guide link 20 further rotates than that of the rear-end portion of the guide link 20. In the storage state of the seat 10, the front-end portion of the guide link 20 is disposed on the bottom of the storage space 13, and the rear-end portion of the guide link 20 is disposed on the rear of the storage space 13. In this case, the guide link 20 moves from the lower direction to the rear lower direction.

The rear link 21 supports the weight of the seat cushion frame 35 by connecting the rear-end portion of the seat cushion frame 35 and the rear of the storage space 13 and lowers the seat cushion frame 35.

Figure 14E:
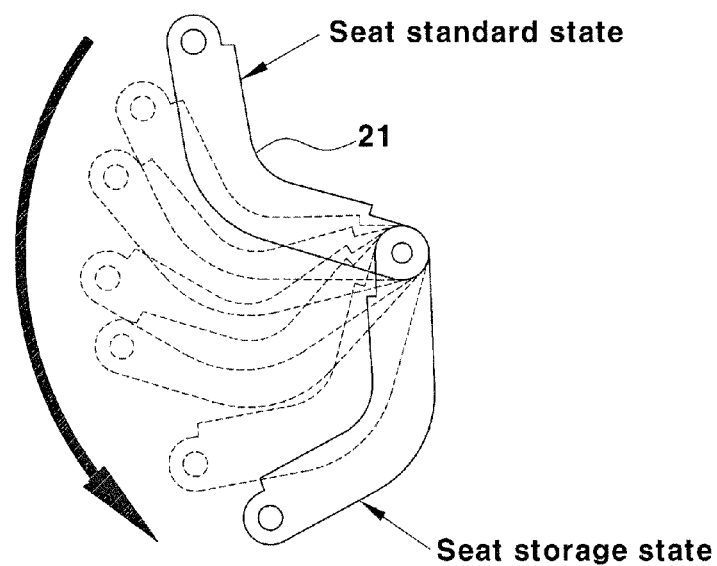

Referring to FIG. 14e, when shifting from the seating mode to the luggage mode, the upper-end portion of the rear link 21 is positioned at an outer upper portion of the storage space 13 from the standard position of the seat 10. However, the upper-end portion of the rear link 21 is positioned on the bottom of the storage space 13 from the storage position of the seat 10. The front-end portion of the rear link 21 moves downwardly about the ninth hinge 30.

As such, all of the links 14 constantly move in the lower direction, so that the seat 10 can uniformly and lightly manipulate when shifting from the seating mode to the luggage mode of the seat.

When the seat 10 is stored in the storage space 13 and pressed until the seat back 11 is in the horizontal state, the folding state of the seat back 11 can be maintained by the cushion locking latch 36 and the recliner 16.

Figure 15:
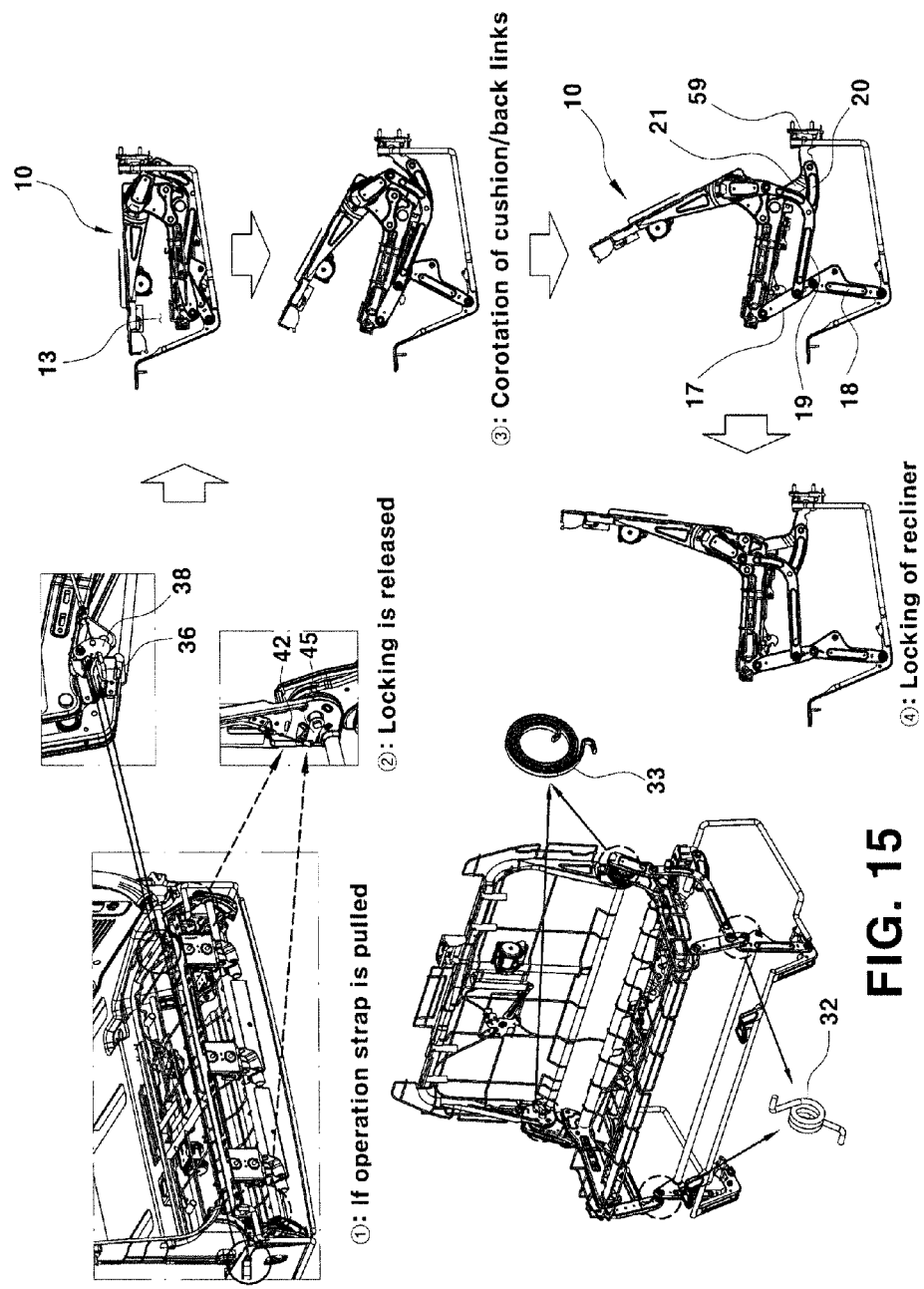
FIG. 15 is a view showing a shifting state from the luggage mode to the seating mode according to the present disclosure.

FIG. 15 is a view showing a shifting state from the luggage mode to the seating mode according to the present disclosure.

2. Seating Mode

The locking state between the recliner 16 and the cushion locking latch 36 is released by moving the operation strap 41 of the seat back 11 in the front direction.

When the operation strap 41 is moved forward in the front direction, the seat back rotation lever 49 rotates at a predetermined angle, and the fixing projections 50 of the seat back rotation lever 49 rotate. Thus, the back recliner release right and left cables 42 and the connection cables 44, coupled to the respective fixing projections 50, are extracted to a predetermined length by the rotation angle of the fixing projections 50.

Subsequently, when the back recliner release right and left cables 42 are pulled, the recliner release lever 45 angularly rotates, thereby releasing the recliner 16.

When the connection cables 44 are pulled, the fixing projections 50 of the seat cushion rotation lever 53 mounted to the seat cushion frame 35 rotate in one direction. Thus, the cushion locking release right and left cables 43 coupled to the respective fixing projections 50 are extracted by the rotation angle of the fixing projections 50.

Subsequently, if the cushion locking release right and left cables 43 are pulled, the cushion locking latches 36 respectively mounted to the left and right sides of the seat cushion frame 35 angularly rotate backward, thereby releasing the locking state of the latch 36.

When the locking of the latch 36 is released, the front upper and front lower links 17 and 18 are adjusted to remain unfolded by the elastic recovery force of the torsion spring 32 mounted therebetween.

If the recliner 16 is released, the seat back 11s adjusted to rotate backward from the seat cushion 12 by the elastic recovery force of the spiral spring 33.

As the main link 19, the guide link 20, and the rear link 21 move upward through the adjustment operation of the front upper and lower links 17 and 18, the seat cushion 12 and the seat back 11 are simultaneously adjusted for a passenger to sit on the seat 10.

1. Improvement Effect in Modification of Link Structure

Figure 16:
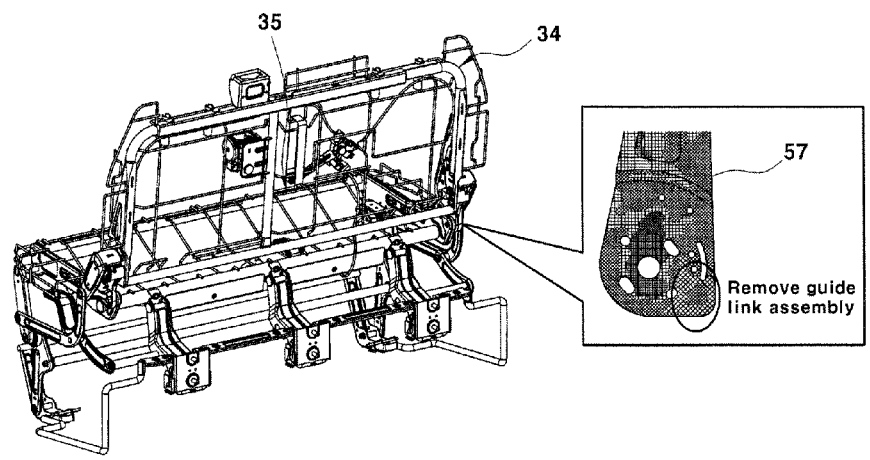
FIG. 16 is a view showing the effect that the hardness of a back side bracket is enhanced according to the modified structure of a guide link according to the present disclosure.
Figure 17:
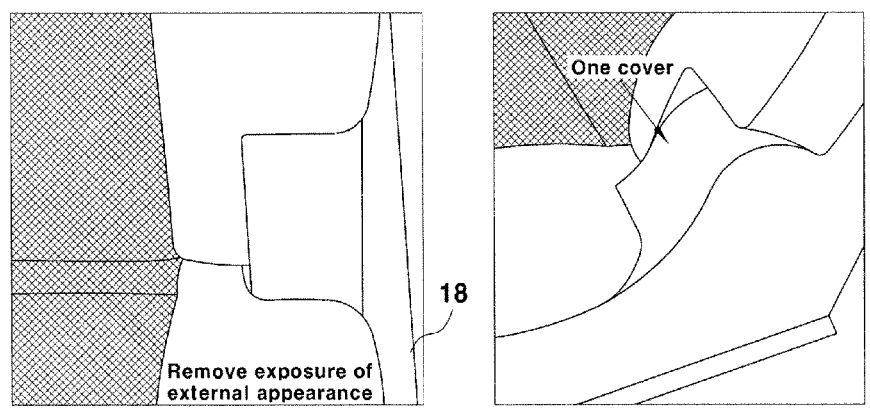
FIG. 17 is a view showing a state in which an exposed external appearance of the guide link is removed when the structure of the guide link is modified according to the present disclosure.

FIG. 16 is a view showing the effect that the hardness of a back side bracket 57 is enhanced by the modified structure of the guide link 20 according to the present disclosure. FIG. 17 is a view showing a state in which an exposed external appearance of the guide link is removed when the structure of the guide link 20 is modified according to the present disclosure.

1) The guide link 20 connects the main link 19 and the rear link 19. The connection portion of the guide link 20 can be removed from the back side bracket 57, thereby enhancing the hardness of the back side bracket 57 by avoiding stress concentration (FIG. 16).

2) One of side covers 58 is removed by assembling the guide link 20 to the main link 19, so that only one side cover 58 can be used. Further, the aesthetic improvement of the link can be obtained by removing the exposure of the external appearance of the link (FIG. 17).

2. Improvement of Assembling Method of Rear Mounting

The assembling method of rear mounting of the seat 10 can be improved using seat attaches 59 and a rear mounting bracket 63.

1) Configuration and Effect of Seat Attaches 59 and Rear Mounting Bracket 63

Figure 18:
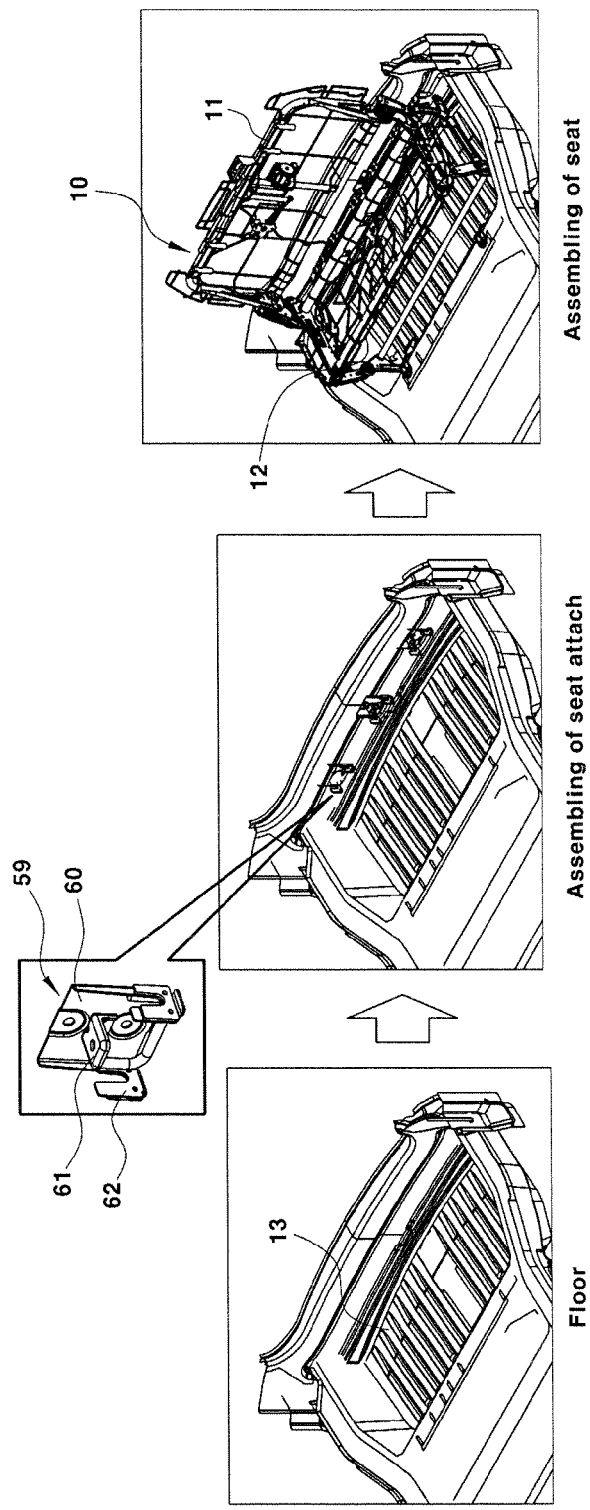
FIG. 18 is a perspective view shown a state in which seat attaches are mounted according to the present disclosure.
Figure 19:
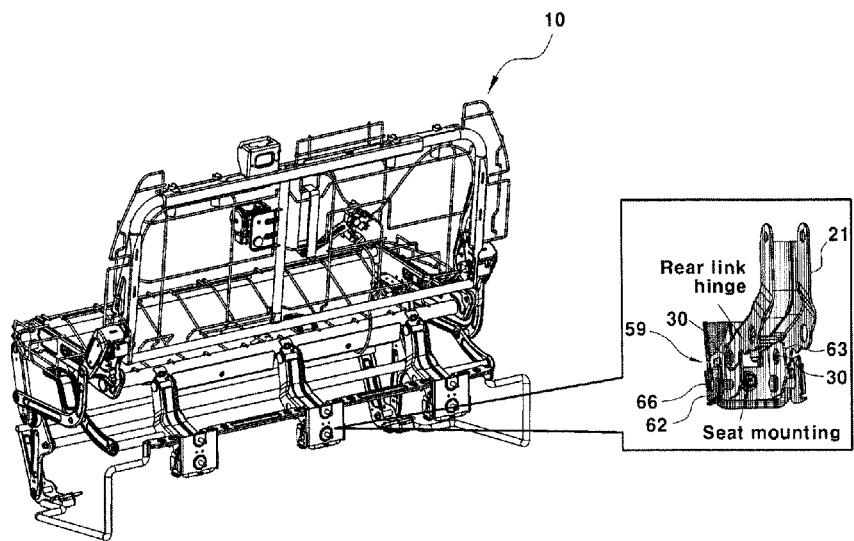
FIG. 19 is a view showing the effect that the stress concentration of the seat attaches is prevented according to the present disclosure.

FIG. 18 is a perspective view of a state in which the seat attaches 59 are mounted according to the present disclosure. FIG. 19 is a view showing the effect that the stress concentration of the seat attaches 59 prevents according to the present disclosure.

As shown in FIG. 18, the seat attaches 59 are manufactured separately from the seat 10 and fixed at three locations of the rear side in the storage space 13. The seat attaches 59 are spaced apart from one another in a width direction of the vehicle before the rear link 21 of the seat 10 is assembled to the of the storage space 13, thereby improving assembling performance and workability.

The rear mounting bracket 63 is hinge-coupled to the rear-end portion of the rear link 21. The rear mounting bracket 63 has a turned-over 'U' shape.

The rear-end portion of the rear link 21 is coupled to the rear mounting bracket 63 by the ninth hinge 30 at both upper portions of the rear mounting bracket 63, and a guide pin protrudes from the rear mounting bracket 63 in the side direction at both lower portions of the rear mounting bracket 63.

The seat attach 59 includes an attach main body 60 attached to the rear of the storage space 13. A protruding plate 61 fixes the mounting bracket, which is horizontally protruded forward from the middle in the vertical length direction of the attach main body 60. A guide groove 62 protrudes forward in a 'U' shape on the left and right side at lower ends of the attach main body 60.

Referring to FIG. 19, upper and lower sides of the attach main body 60 are respectively assembled by bolts, based on the ninth hinge 30 of the rear link 21, thus avoiding stress concentration caused by the vertical rotation moment when the rear link 21 is rotated in the vertical direction and enhancing the hardness of the seat attach 59.

2) Improvement of Assembling Performance of Seat 10 Using Fixed-Type Rear Mounting Bracket 63

Figure 20:
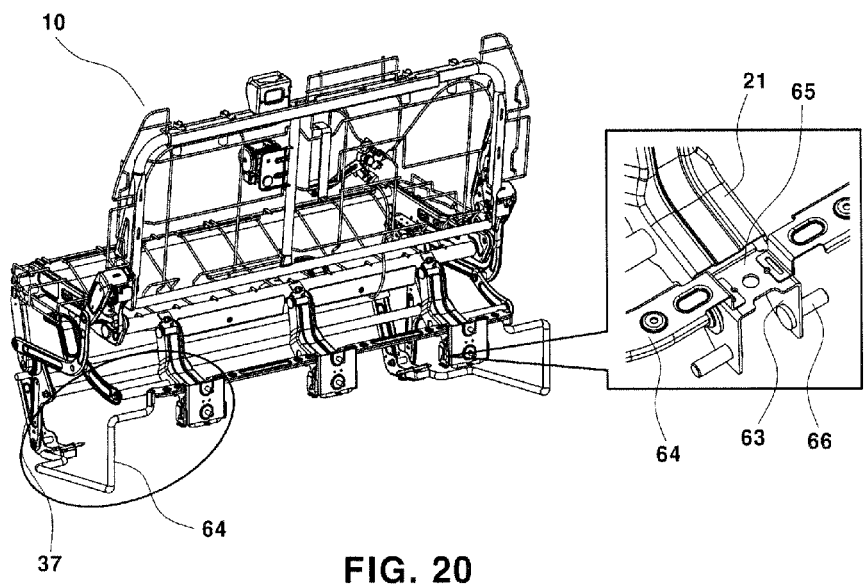
FIG. 20 is a view showing a state in which a rear link and a rear mounting are assembled according to the present disclosure.

FIG. 20 is a view showing a state in which the rear link 21 and the rear mounting are assembled according to the present disclosure. A mounting bracket fixing frame 64 prevents the rear mounting bracket 63 from rotating in the front-back direction about the ninth hinge 30 of the rear link 21, thereby improving the assembling performance of the seat 10.

More specifically, the mounting bracket fixing frame 64 is horizontally fixed to the bottom of the storage space 13 by connecting both end portions of the mounting bracket fixing frame 64 to the front mounting frame 37. The mounting bracket fixing frame 64 has an irregular portion 65 formed in a 'U' shape having end portions protruding downward while being spaced apart from each other at a predetermined interval with the central portion interposed therebetween. The irregular portion 65 is connected to the top surface of the rear mounting bracket 63 by a fastening means through welding etc., to prevent the rear mounting bracket 63 from rotating.

If the rear mounting bracket 63 has a rotatable structure, the workability and assembling performance of the seat 10 is decreased due to the interference of the rear mounting bracket 63 with the vehicle body (storage space 13) when the seat 10 is assembled. Accordingly, the assembling performance of the seat 10 can be improved by preventing the rotation of the rear mounting bracket 63.

3) Improvement of Assembling Performance of Seat 10 Using Guide Shape of Seat Attach 59

Figure 21:
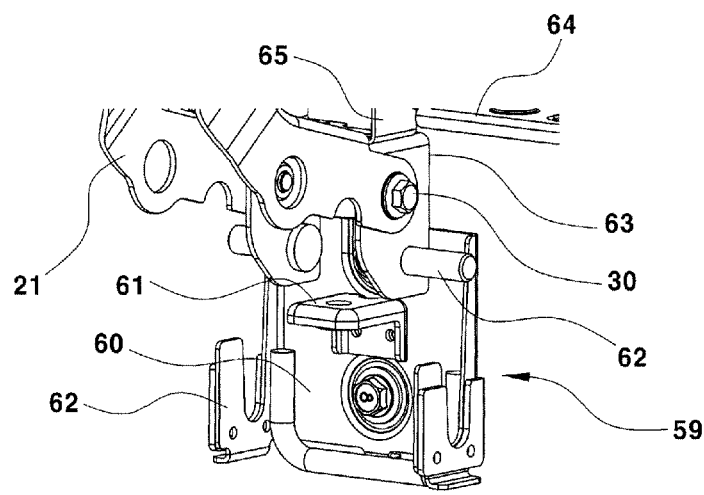
FIG. 21 is a perspective view showing a state in which the rear link is assembled according to the present disclosure.

FIG. 21 is a perspective view showing a state in which the rear link 21 is assembled according to the present disclosure. The assembling performance of the seat 10 can be improved using the U-shaped guide groove portion 62 disposed at both sides of the seat attach 59.

For example, the rear link 21 is coupled to the upper rear end of the storage space 13 by the ninth hinge 30. In this case, the seat attach 59 is assembled in a state in which the rear mounting bracket 63 is coupled to the rear-end portion of the rear link 21 by the ninth hinge 30. The rear mounting bracket 63 is first assembled to the seat attach 59 and then fastened to the seat attach 59 using a bolt.

More specifically, when a guide pin 66 protruding sideward from both lower ends of the rear mounting bracket 63 is latched to the U-shaped guide groove portion 62 formed at both the sides of the seat attach 59, i.e., when the rear mounting bracket 63 is first assembled to the seat attach 59, the rear mounting bracket 63 can be easily assembled to the seat attach 59 without lifting a back portion of the seat 10.

Figure 22:
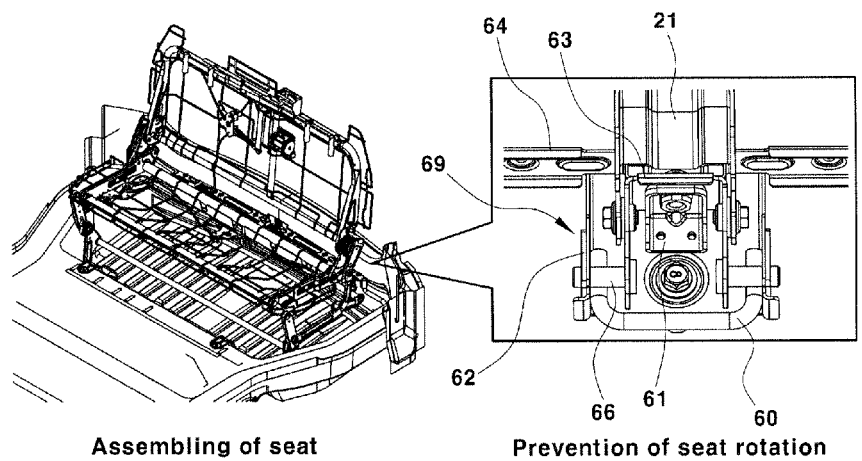
FIG. 22 is a view showing a state in which the rotation of the seat is prevented when the seat is assembled according to the present disclosure.

4) Application of Seat Attach 59 to Prevent Seat 10 from Drooping Downward After Seat 10 is Assembled FIG. 22 is a view showing a state in which the rotation of the seat 10 is prevented when the seat 10 is assembled according to the present disclosure. The protruding plate 61 protrudes on the attach main body 60 of the seat attach 59 outward, having a bolt aperture so that the rear mounting bracket 63 is bolted to the seat attach 59.

The rear mounting bracket 63 has a turned-over 'U' shape. The rear mounting bracket 63 is mounted on the protruding plate 61 of the seat attach 59 so as to be latched to the protruding plate 61 by inserting the protruding plate 61 of the seat attach 59 into the rear mounting bracket 63 through an opening positioned at the lower end of the rear mounting bracket 63.

The rear mounting bracket 63 is supported by the protruding plate 61 of the seat attach 59, thus preventing the seat 10 from drooping downward.

Figure 23:
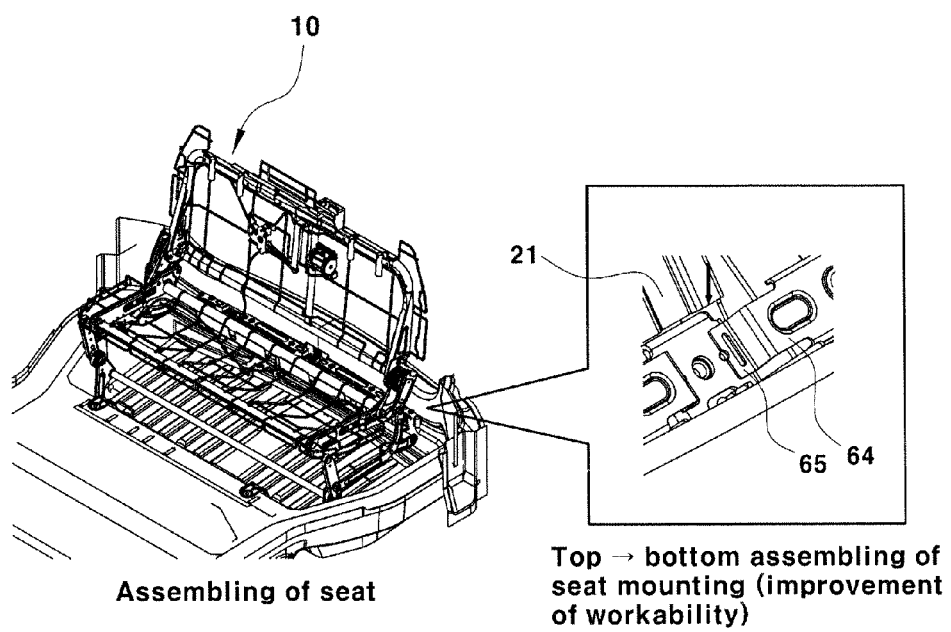
FIG. 23 is a perspective view showing a state in which a rear mounting aperture is used in a vertical assembling method according to the present disclosure.

5) Easy Recognition of Bolt Aperture in Assembling of Back Portion of Seat 10 After Seat 10 is Assembled FIG. 23 is a perspective view showing a state in which a rear mounting aperture is used in a vertical assembling method according to the present disclosure. A bolt aperture is formed at an upper-end portion of the rear mounting bracket 63. The bolt aperture formed in the irregular portion 65 of the mounting bracket fixing frame, which is 64 coupled to the upper-end portion of the rear mounting bracket 63, has the same size as the bolt aperture of the rear mounting bracket 63.

The assembling method of the rear mounting bracket 63 will be described. The rear mounting bracket 63 is bolt-fastened to the seat attach 59 where the rear mounting bracket 63 and the mounting bracket fixing frame 64 are disposed on the protruding plate 61. The bolt aperture of the rear mounting bracket 63 corresponds to the bolt aperture formed in the protruding plate 61 of the seat attach 59, thereby completing the assembling.

The assembling method is a vertical assembling method. The bolt aperture can be easily recognized when the rear mounting bracket 63 is assembled, thereby improving workability.

3. Application of Cushion Locking Latches 36

The cushion locking latches 36 are respectively applied to both sides of the seat cushion frame 35 to prevent the seat 10 from being released from the floor caused by irregular driving, vehicle collision, etc., thereby preventing an accident.

In a case where the cushion locking latch 36 is applied to only one side of the seat cushion frame 35, stress concentration occurs in one latch 36 by irregular driving, etc., thereby damaging the cushion locking latch 36. The cushion locking latches 35 may be respectively applied to both sides of the seat cushion frame 35.

Further, the various kinds of release cables connected to the cushion locking latch 36 are firmly attached to the seat cushion frame 35 without drooping. Thus, the cables are not exposed to the outside.

4. Decrease in Number of the Various Cables and Components by Using Recliner 16 and the Operation Strap 41 for Releasing Cushion Locking Latch 36

The back recliner release lever assembly 46 for releasing the locking of the recliner 16 is mounted to the seat back frame 34, and the cushion locking release lever assembly 47 for releasing the cushion locking latch 36 is mounted to the seat cushion frame 35. Thus, the operation strap 41 is connected to the back recliner release lever assembly 46, and the connection cable 44 is connected between the back recliner release lever assembly 46 and the cushion locking release lever assembly 47. Therefore, the back recliner release lever assembly 46 and the cushion locking release lever assembly 47 are simultaneously operated by moving only one operation strap. Accordingly, the locking of the seat 10 can be easily released, and the number of various release cables and components can be decreased.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A storage apparatus for a seat of a vehicle, comprising:
a plurality of links supporting the seat including a seat back and a seat cushion, the plurality of links mounted on a floor in a hinge structure to be foldable and adjustable; and
an elastic member returning the seat to an original position thereof by adjusting a storage state of the seat,
wherein the seat is stored inside a storage space recessed in the floor in a luggage mode or returned to the original position in a seating mode,
the plurality of links include a front upper link and a front lower link hingedly connected to each other, the front upper link connected to a front-end portion of the seat cushion in the hinge structure to be foldable and adjustable, and
the seat shifts from the original position to a storage space recessed position as the hinge structure moves toward the seat back to be folded, and shifts from the storage space recessed position to the original position as the seat back moves vertically upward with the hinge structure to be unfolded.

2. The storage apparatus of claim 1, wherein the plurality of links include:
a rear link rotatably connected to a rear-end portion of the seat cushion;
a main link rotatably and hingedly connected between the front upper link and the seat back in the hinge structure; and
a guide link connected between the main link and the rear link in the hinge structure.

3. The storage apparatus of claim 2, wherein the main link guides the front upper and lower links to be folded inside the storage space when the seat back is folded and the seat cushion is lowered.

4. The storage apparatus of claim 2, wherein the guide link maintains an interval between the main link and the rear link by simultaneously rotating together with the main link and the rear link when the seat back is folded and the seat cushion is lowered, and uniformly transfers a seat weight to the main link and the rear link.

5. The storage apparatus of claim 2, wherein the front upper link, the front lower link, the main link, the rear link and the guide link are all controlled to move at the same time, and each link is controlled to move constantly in one direction.

6. The storage apparatus of claim 1, comprising:
a recliner mounted to the seat back, and maintaining an adjusting or folding state of the seat back by locking the seat back;
a striker fixed to a bottom of the storage space; and
a cushion locking latch mounted to a seat cushion frame in the hinge structure, and maintaining the storage state of the seat as the cushion locking latch is latched to the striker.

7. The storage apparatus of claim 6, comprising:
an operation strap manually releasing a locking state of the seat back;
a recliner release lever releasing the locking of the recliner;
a back recliner release lever assembly mounted to the seat back, and connected to the recliner release lever through a back recliner release cable, so as to release the locking of the recliner;
a cushion locking release lever assembly mounted to the seat cushion, and connected to the cushion locking latch through a cushion locking release cable, so as to release the locking of the cushion locking latch; and
a connection cable connecting the back recliner release lever assembly and the cushion locking release lever assembly, thereby simultaneously releasing the locking of the recliner 16 and the locking of the cushion locking latch when the operation strap is operated.

8. The storage apparatus of claim 7, wherein the back recliner release lever assembly includes:
a seat back rotation lever having one end portion mounted to the seat back and the other end portion rotated by being linked with the operation strap; and
a fixing projection disposed around one end portion of the seat back rotation lever, and connected to the back recliner release cable and the connection cable, so as to simultaneously operate the back recliner release cable and the connection cable when being rotated in one direcion.

9. The storage apparatus of claim 7, wherein the cushion locking release assembly includes:
a seat cushion rotation lever rotatably mounted to the seat cushion in the hinge structure; and
a fixing projection disposed at an edge of the seat cushion rotation lever, and connected to the cushion locking release cable and the connection cable, so as to simultaneously operate the cushion locking release cable and the connection cable when being rotated in one direction,
wherein the seat back rotation lever and the seat cushion rotation lever are linked with each other through the connection cable.

10. The storage apparatus of claim 1, wherein the elastic member includes;
a torsion spring mounted between the links, so as to return the seat to an original state by adjusting the links in the folding state by an elastic recovery force thereof; and
a spiral spring mounted at a lower end of the seat back, so as to return the seat to the original state by adjusting the seat back in the folding state by an elastic recovery force thereof.

11. The storage apparatus of claim 1, comprising:
a rear mounting bracket mounted to a rear link in the hinge structure, having guide pins respectively disposed at both lower ends thereof; and
seat attaches mounted at a rear of the storage space while being spaced apart in a width direction of the vehicle, and having guide groove portions respectively defined at both lower ends thereof,
wherein the rear mounting bracket is first assembled to the seat attaches by respectively latching the guide pins to the guide groove portions when the seat is assembled, thereby facilitating an assembling of the seat.

12. The storage apparatus of claim 11, wherein the seat includes a mounting bracket fixing frame fixed and attached to an upper-end portion of the rear mounting bracket using an irregularity structure, and preventing the rear mounting bracket from being rotated about the rear link, thereby preventing the degradation of workability caused by a vehicle body interference when the seat is assembled.

13. The storage apparatus of claim 12, wherein the upper-end portion of the rear mounting bracket and an irregularity portion of the mounting bracket fixing frame are vertically bolted to each other to easily recognize a mounting aperture.

* * * * *